(Model.) 2 Sheets—Sheet 1.
S. STONER.
COMBINED HAY RACK, STOCK FEEDER, AND SHELTER.
No. 269,477. Patented Dec. 19, 1882.
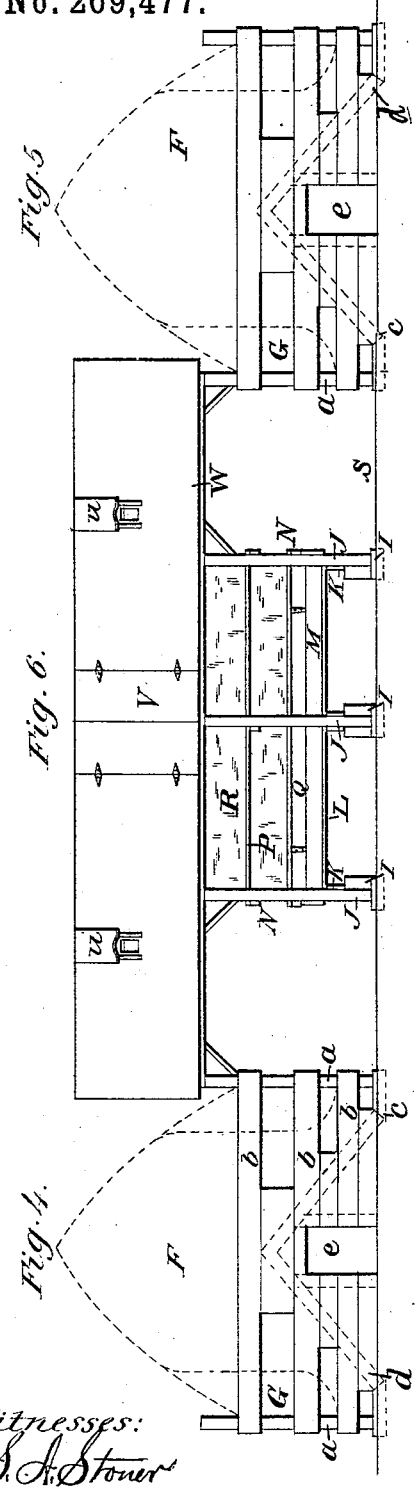
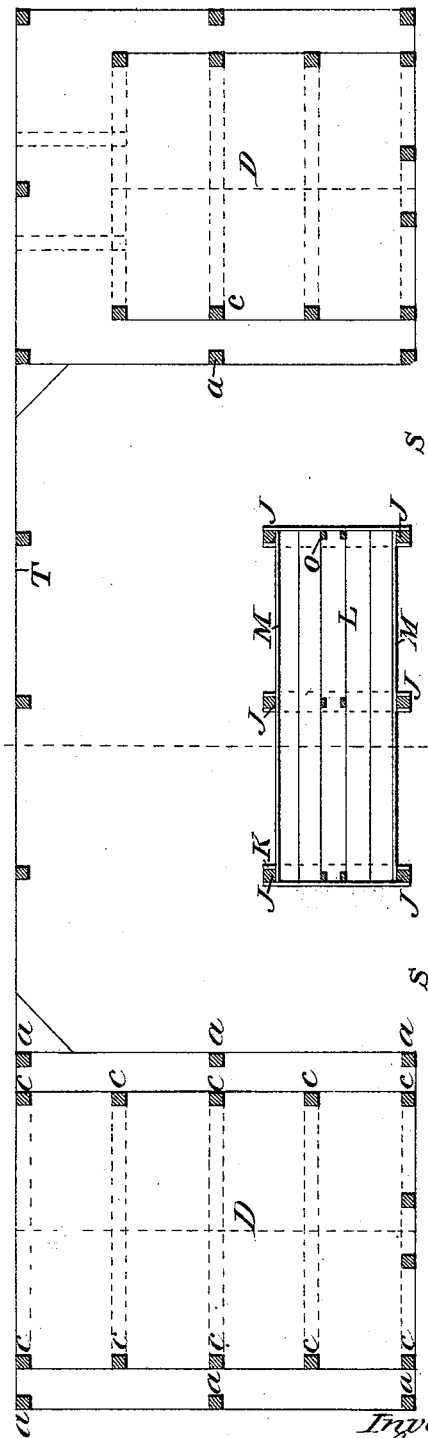
Witnesses:
S. A. Stoner
L. L. Nichols
Inventor:
Saml. Stoner (Model.)

2 Sheets—Sheet 2.

S. STONER.
COMBINED HAY RACK, STOCK FEEDER, AND SHELTER.

No. 269,477.            Patented Dec. 19, 1882.

Witnesses:
S. A. Stover
L. L. Nichols

Inventor:
Sam'l Stoner

N. PETERS, Photo-Lithographer, Washington, D. C.

UNITED STATES PATENT OFFICE.

SAMUEL STONER, OF LANCASTER, KANSAS.

COMBINED HAY-RACK, STOCK FEEDER, AND SHELTER.

SPECIFICATION forming part of Letters Patent No. 269,477, dated December 19, 1882.

Application filed April 14, 1880. (Model.)

*To all whom it may concern:*

Be it known that I, SAMUEL STONER, a citizen of the United States, residing at Lancaster, in the county of Atchison and State of Kansas, have invented a new and useful Combined Hay-Rack, Stock Feeder, and Shelter, of which the following is a specification.

The construction of my improved hay-rack, stock feeder, and shelter will first be described, its uses and advantages named, and then the parts or combinations which constitute my invention will be designated in the claim.

Figure 8:
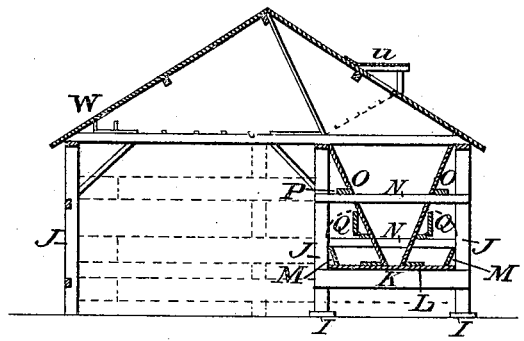
Figure 7:
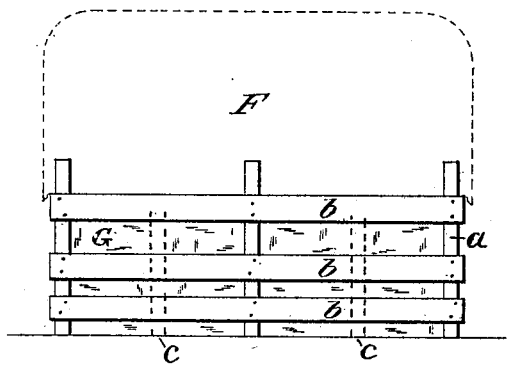

In the accompanying drawings, Figures 1, 2, and 3 are a ground plan of the entire apparatus. Figs. 4, 5, and 6 are elevations or side views of the same. Fig. 7 is an elevation or end view of the hay-rack. Fig. 8 is a vertical section taken on the line B and C of Fig. 3.

The letter $a$ designates vertical posts set upon the ground; $b$, horizontal boards or poles nailed against the posts and forming four sides of a pen which incloses a square space, D. The upper edge of the middle board $b$ in practice should just be high enough from the ground for cattle or horses to conveniently get their heads and necks over it, and the upper board should be high enough above the middle one—say about eighteen inches—to afford a space or opening, G, between, through which cattle or horses may enter their heads to eat hay. Within the pen or square space rafters or angling props $d$ (see broken lines, Figs. 4 and 5) have their lower ends resting upon the ground, as at $c$. Their upper ends are cut at an angle, and are either nailed against a ridge-board, or the angle-cut ends of two—one on each side—are abutted together. In this way they have the arrangement of rafters for a roof. These angling props are then covered with boards or poles, and thereby a shelter, $e$, is formed below, and at the same time a base or stand with two sloping sides is formed on which to stack the hay F. This base with sloping sides and surrounding square pen, without roof or cover, constitutes the hay-rack. Before the hay is put in ventilators may be inserted, and when the hay is thus stacked in an open field, the air has access to it underneath the bottom, and at a higher point in the middle, or, diametrically considered, than elsewhere, whereby the curing out of the entire stacked bulk of hay is greatly facilitated. The pen keeps the hogs away entirely from the hay, while the space or opening G affords access for the heads of cattle. The latter will then, by eating hay at the side, hollow out a manger all around without waste, after which the further supply of hay for the cattle is right at hand above the manger.

Below the hay-stand is a space, $e$, with a two-way sloping roof, adapted as a warm dry shelter for small stock, such as hogs, calves, lambs, &c.; or it can be advantageously used as a storage-place for any kind of roots, carrots, turnips, and like produce. In connection with the foregoing I employ a shelter and grain-feeder for large stock.

The letter I designates stone pillars; J, posts set upon the pillars; K, sills or joists nailed to the posts, and L a floor laid upon the joists. The floor constitutes the bottom of a double trough—*i. e.*, two troughs—of which the horizontal boards M, placed on their edge upright and slightly inclined, are the outer sides. Wooden cross-pieces N are secured to each set of two opposite posts, and two inclined upright pieces, O, are set up between each two posts. The lower ends of two opposite inclined pieces are near each other, while the upper ends are spread widely apart. Horizontal pieces P are laid on the cross-pieces and against the outer side of the inclined pieces O, and extend lengthwise of the grain-feeder. The inner sides of the inclined pieces support a lining of boards, R, and thus form the sides of a hopper. The ends of the hopper are also closed by boards. The grain is delivered from the small bottom of the hopper into each of the side troughs, and a hinged cover, Q, is provided to close each trough. This grain-feeder is placed between two of the hay-racks, one of the outer long sides of the grain-feeder being on a line with the one of the outer sides of the said two racks, and a space or opening, S, left between each end of the grain-feeder, and the whole space between the two racks and over the grain-feeder is then covered by a roof, W. The opposite outer sides of the said two racks along one eave of the roof are connected by a wall or inclosure, T. By this arrangement, which is clearly shown in the ground plan view, Figs. 1, 2, and 3, the large stock—cattle, horses, &c.—may pass under the roof and into the inclosure through the opening S, and then be sheltered where they can have access to the hay at each end and to the grain at the center.

Ventilators $u$ are fixed in the roof, and also doors $v$, which latter gain access to the grain-hopper.

Having described my invention, I claim and desire to secure by Letters Patent of the United States—

In a hay-rack, the combination of a base or stand having two sloping sides arranged like a roof, with the lower edge of each side resting upon the ground, and a pen without cover, whose walls surround the stand and rise above the sloping sides, and said walls having an opening leading to the space $e$ below the stand, and another opening, G, to give access to hay above the stand, as set forth.

SAMUEL STONER.

Witnesses:
 JNO. J. BOYD,
 CHAS. W. RUSK.